(12) United States Patent
Mine et al.

(10) Patent No.: US 6,947,265 B2
(45) Date of Patent: Sep. 20, 2005

(54) MATRIX CURRENT LIMITER WITH TRANSFORMER CONFIGURATIONS

(75) Inventors: Susumu Mine, Schenectady, NY (US); Xing Yuan, Albany, NY (US)

(73) Assignee: SuperPower, Inc.

( * ) Notice: Subject to any disclaimer, the term of this patent is extended or adjusted under 35 U.S.C. 154(b) by 297 days.

(21) Appl. No.: 10/462,353

(22) Filed: Jun. 16, 2003

(65) Prior Publication Data

US 2004/0252420 A1 Dec. 16, 2004

(51) Int. Cl.$^7$ ................................................ H02H 7/00
(52) U.S. Cl. ........................................ 361/19; 361/93.9
(58) Field of Search ........................ 367/19, 93.1, 93.9, 367/115, 58

(56) References Cited

U.S. PATENT DOCUMENTS

| | | | | |
|---|---|---|---|---|
| 3,633,046 A | * | 1/1972 | Dewey | 327/460 |
| 5,546,261 A | * | 8/1996 | Yoshida et al. | 361/19 |
| 5,617,280 A | * | 4/1997 | Hara et al. | 361/19 |
| 5,726,848 A | * | 3/1998 | Boenig | 361/93.9 |
| 6,275,365 B1 | * | 8/2001 | Kalsi et al. | 361/19 |
| 6,664,875 B2 | * | 12/2003 | Yuan et al. | 335/216 |
| 2002/0018327 A1 | | 2/2002 | Walker | |
| 2003/0021074 A1 | | 1/2003 | Yuan | |

OTHER PUBLICATIONS

Eddie Leung, "Surge Protection for Power Grids," IEEE Spectrum, Jul. 1997, pp 26–30 vol. 34, No. 7, IEEE, New York USA.

* cited by examiner

Primary Examiner—Stephen W. Jackson
(74) Attorney, Agent, or Firm—George L. Rideout, Jr., Esq.; Enrique Abarca, Esq.

(57) ABSTRACT

An isolation transformer is introduced into a matrix fault current limiter (MFCL) and is used to couple elements in trigger matrices and current limiting matrices. The isolation transformer can either be a voltage step-up or step-down configuration. In step-up configurations, the increased voltage supplied to the current limiting elements improves the quenching of the superconductor. In step-down configurations, current limiting elements are subject to lower voltage potentials thereby reducing the electrical insulation requirement between the trigger matrix and the current limiting matrix. In addition, the voltage amplification coefficient of each isolation transformer can vary for different columns of the current limiting matrix to maximize the current limiting performance.

20 Claims, 8 Drawing Sheets

MATRIX CURRENT LIMITER WITH TRANSFORMER CONFIGURATIONS

BACKGROUND

The invention relates generally to a current limiter and more particularly to a superconducting current limiter with a transformer coupled trigger mechanism.

Current limiting devices are critical in electric power transmission and distribution systems. For various reasons such as lightening strikes, short circuit conditions can develop in various sections of a power grid causing sharp surge in current. If this surge of current, which is often referred to as fault current, exceeds the protective capabilities of the switchgear equipment deployed throughout the grid system, it could cause catastrophic damage to the grid equipment and customer loads that are connected to the system.

Superconductors, especially high-temperature superconducting (HTS) materials, are well suited for use in a current limiting device because of their intrinsic properties that can be manipulated to achieve the effect of a "variable impedance" under certain operating conditions. A superconductor, when operated within a certain temperature and external magnetic field range (i.e., the "critical temperature" ($T_c$,) and "critical magnetic field" ($H_c$,) range), exhibits no electrical resistance if the current flowing through it is below a certain threshold (i.e., the "critical current level" ($J_c$,)), and is therefore said to be in a "superconducting state."

However, if the current exceeds this critical current level the superconductor will undergo a transition from its superconducting state to a "normal resistive state." This transition of a superconductor from a superconducting state to a normal resistive state is termed "quenching." Quenching can occur if any one or any combination of the three factors, namely the operating temperature, external magnetic field or current level, exceeds their corresponding critical level.

The surface plot shown in FIG. 1 illustrates the interdependency among these three factors ($T_c$, $H_c$, and $J_c$,) for a typical superconducting material type. As shown in FIG. 1, the surface plot includes three axes T, H, and J, where $T_c$ is the critical temperature below which the superconducting material must be cooled to remain in the superconducting state, where $H_c$ is the critical magnetic field above which the superconducting material cannot be exposed in order to remain in a superconducting state, and where $J_c$ is the critical current density in the superconducting material that cannot be exceeded for the superconductor to remain in a superconducting state. The "critical J-H-T surface" represents the outer boundary outside of which the material is not in a superconducting state. Consequently, the volume enclosed by the critical J-H-T surface represents the superconducting region for the superconducting material.

A superconductor, once quenched, can be brought back to its superconducting state by changing the operating environment to within the boundary of its critical current, critical temperature and critical magnetic field range, provided that no thermal or structural damage was done during the quenching of the superconductor. An HTS material can operate near the liquid nitrogen temperature 77 degrees Kelvin (77 K) as compared with a low-temperature superconducting (LTS) material that operates near liquid helium temperature (4 K). Manipulating properties of a HTS material is much easier because of its higher and broader operating temperature range.

The quenching of a superconductor to the normal resistive state and subsequent recovery to the superconducting state corresponds to a "variable impedance" effect. A superconducting device with such characteristics is ideal for a current limiting application. Such a device can be designed so that under normal operating conditions, the operating current level is always below the critical current level of the superconductors, therefore no power loss ($I^2R$ loss) will result during the process. When the fault conditions occurs the fault current level exceeds the critical current level of the superconducting device, thus creating a quenching condition. By the same token, mechanisms altering the device operating temperature and/or magnetic field level can be put in place either as a catalyst or an assistant to achieving faster quenching and recovery of such a superconducting device.

For some HTS materials such as the bulk BSCCO elements, there often exist, within the volume of the superconductor, non-uniform regions resulted from manufacturing process. Such non-uniformed regions can develop into the so-called "hot spots" during the surge of current that exceeds the critical current level of the superconductor. Essentially, at the initial stage of the quenching by the current, some regions of the superconductor volume become resistive before others do due to the non-uniformity. A resistive region will generate heat from its associated $i^2r$ loss. If the heat generated could not be propagated to its surrounding regions and environment quickly enough, the local heating will damage the superconductor and could lead to the breakdown (burn-out) of the entire superconductor element.

U.S. Patent Publication Ser. No. 2003/0021074A1, Ser. No. 10/051,671, published Jan. 30, 2003, entitled, "Matrix-type Superconducting Fault Current Limiter" assigned to the assignee of the present invention, incorporated by reference in its entirety, uses a mechanism that combines all three of the quenching factors of the superconductor, namely current, magnetic field and temperature, to achieve a more uniformed quenching of superconductor during current limiting. This so-called MFCL concept can dramatically reduce the burn-out risks in bulk superconducting materials due to the non-uniformity existed in the superconductor volume. In addition, the detection of a fault and subsequent activation of the current-limiting impedance of the MFCL are done passively by built-in matrix design, without assistance of active control mechanism. This makes a fault current limiter based on the MFCL concept more easily designed, built and operated for a wide range of potential current-limiting applications.

The MFCL concept utilizes the voltage generated by the quenching of superconducting elements in the so-called trigger matrix and the magnetic field generated in parallel-connected trigger inductors ( ) from that voltage, to quench the superconducting elements in the so-called current-limiting matrix. The magnetic coupling is achieved by physically wind the parallel-connected coils of the trigger matrix, directly around the superconducting elements in the current-limiting matrix. Because of this intricate relationship between the elements of the two matrices, the design of the MFCL requires careful consideration of voltage, magnetic field strength, coil design and various other factors.

BRIEF DESCRIPTION

It is an object of this invention to introduce a MFCL where the voltage used to generate magnetic field to quench superconducting elements in the current-limiting matrix can be controlled and isolated. To that end an isolation transformer is used to couple the voltage generated by the quenching of superconducting elements in the so-called trigger matrix, and the voltage used to generate magnetic field to quench superconducting elements in the current-limiting matrix. The transforming ratio of this transformer is then be used to control the latter voltage to accomplish any design requirement. This configuration also reduces design dependency of the trigger matrix and the fault current matrix.

Briefly, in accordance with one embodiment of the present invention, a current limiting device incorporates components made of superconducting and non-superconducting electrically conductive materials. This so-called Matrix Fault Current Limiter (MFCL) device includes a trigger matrix having "1×n" (column×row) number of trigger elements electrically connected in series with a current limiting matrix containing "m×n" number of current-limiting elements. Each trigger element within the trigger matrix includes one non-inductively arranged superconducting component electrically connected in parallel with a non-superconducting inductor as well as the primary winding of an isolation transformer. Each current limiting element within the current limiting matrix includes one non-inductively arranged superconducting component electrically connected in parallel with one non-superconducting inductor as well as another inductor that is electrically connected in parallel with the secondary winding of the isolation transformer. The inductor that is electrically connected in parallel with the secondary winding of the isolation transformer, is physically wound around the superconducting component of the current-limiting element to achieve the magnetic coupling.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
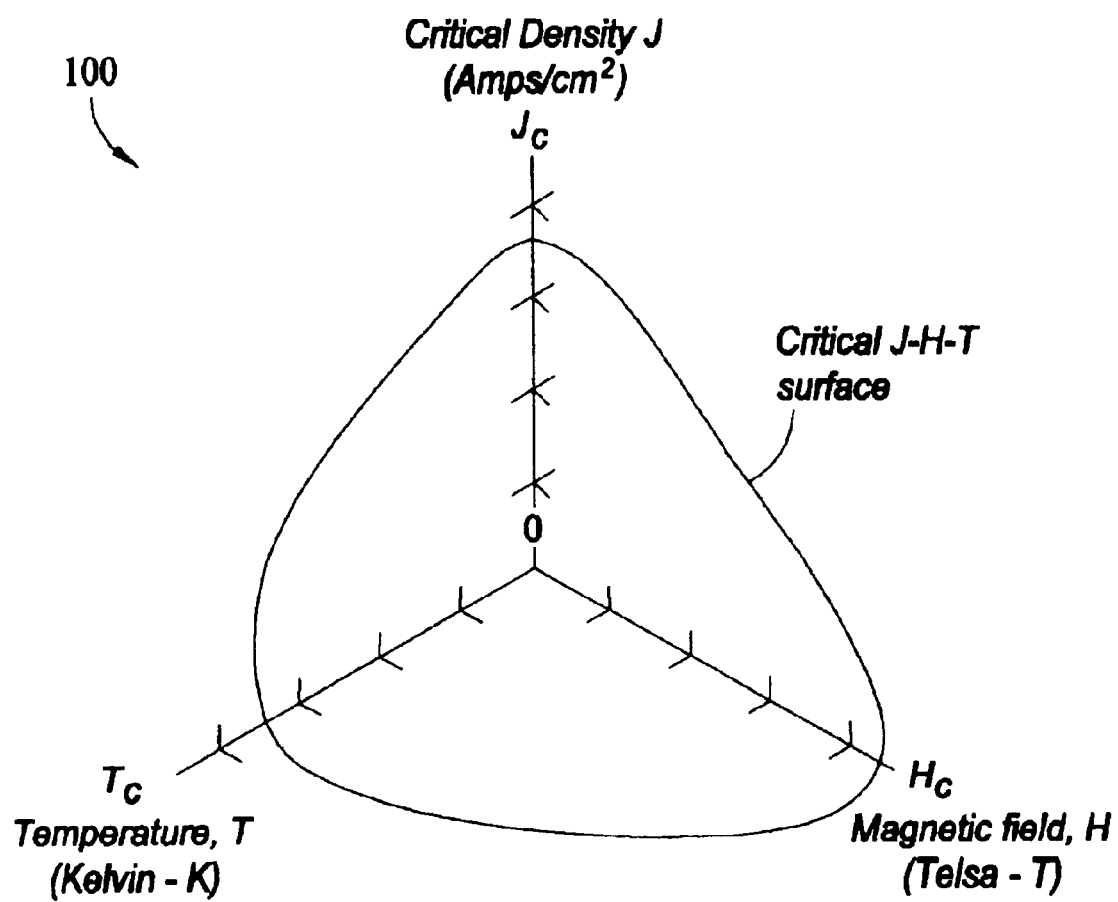
FIG. 1 shows the inter-dependency of critical current level, critical temperature and critical magnetic field of a typical superconducting material.
Figure 2:
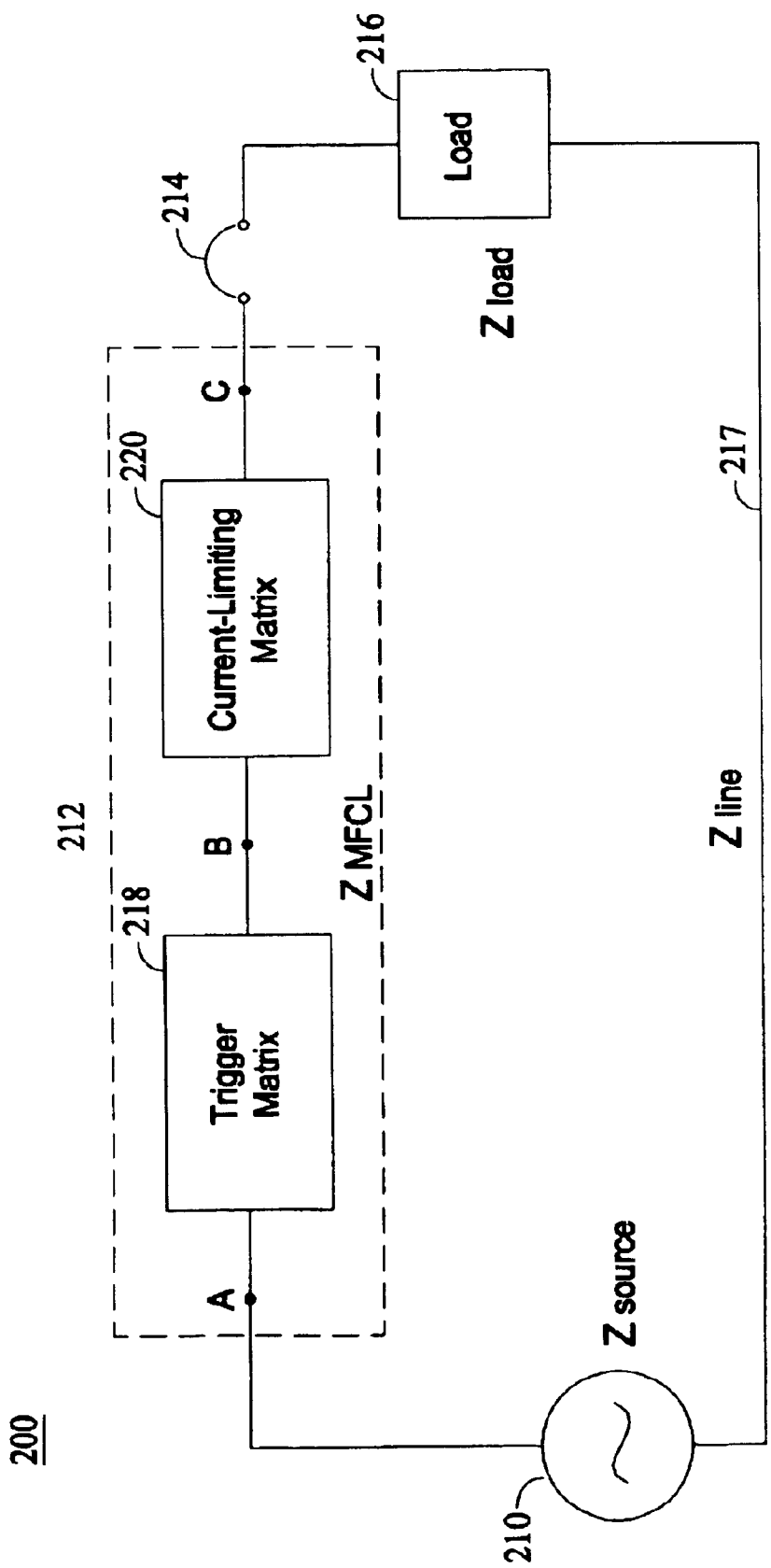
FIG. 2 shows an example of an MFCL device being used in an AC circuit that is representative of a single-phase electric power transmission and distribution system in its simplest form.

FIG. 2 shows an AC circuit 200 that is representative of a single-phase electrical power transmission and distribution system in its simplest form. The AC circuit 200 includes an AC source 210 that is a single-phase power source in a three-phased electricity transmission or distribution network with associated impedance $Z_{source}$ and overall line impedance $Z_{Line}$. The AC source 210 supplies a load 216 that has associated impedance $Z_{Load}$. Electrically connected in series between the AC source 210 and the load 216 is a matrix fault current limiter (MFCL) 212 device having an associated impedance $Z_{MFCL}$ when a fault condition occurs, and a conventional circuit breaker 214. Absent the MFCL 212 in the AC circuit 200, the fault current level when the load 216 is electrically shorted to ground is determined by $i_1=V_{Source}/(Z_{Source}+Z_{Line})$. However, the inclusion of the MFCL 212 in the AC circuit 200 limits the fault current level to a value $i_2=V_{Source}/(Z_{Source}+Z_{Line}+Z_{MFCL})$. As long as $Z_{MFCL}$ is non-zero when the fault occurs, the $i_2$ level is lower than $i_1$, thus achieving the fault current limiting function. If $i_2$ is limited to within the designed fault current interrupting capability of the circuit breaker 214, the circuit breaker 214 will be able to function normally, thereby providing protection to the power grid and customer equipment.

MFCL 212 functions essentially as a "variable impedance" in an electric network. Under normal operating conditions the impedance of the MFCL 212 device is essentially zero. When there is a sudden surge of current in the network, due to presence of a fault condition, the MFCL 212 immediately introduces pre-determined impedance $Z_{MFCL}$ into the network, thus achieving the current limiting function. As described earlier, superconducting materials can undergo a transition from a superconducting no-electrical-resistance state to a normal resistive state (i.e., quenching) when any one or any combination of three factors, namely the passed-through current, the external magnetic field and the operating temperature, exceeds their corresponding "critical level." The quenching of a superconductor and subsequent recovery to its superconducting state corresponds to a "variable impedance" effect. The "variable impedance" feature of the MFCL 212 is achieved by incorporating such superconducting components into the device design and by manipulating the three factors that trigger the quenching of those superconducting components. The superconducting components are represented by variable resistance symbols in all the figures contained within.

As shown in FIG. 2, the MFCL 212 includes a trigger matrix 218 arranged between a node A and a node B in series with a current-limiting matrix 220 that is arranged between node B and a node C. The primary function of the trigger matrix 218 is, under a fault condition, to generate a voltage that can be used to create additional magnetic field that is sufficient enough to trigger the quenching of superconducting components in the current-limiting matrix 220. The primary role of the current-limiting matrix 220 is to provide a majority of the required overall current-limiting impedance once the superconducting components in the MFCL 212 are transitioned to their resistive state during the fault.

Figure 3:
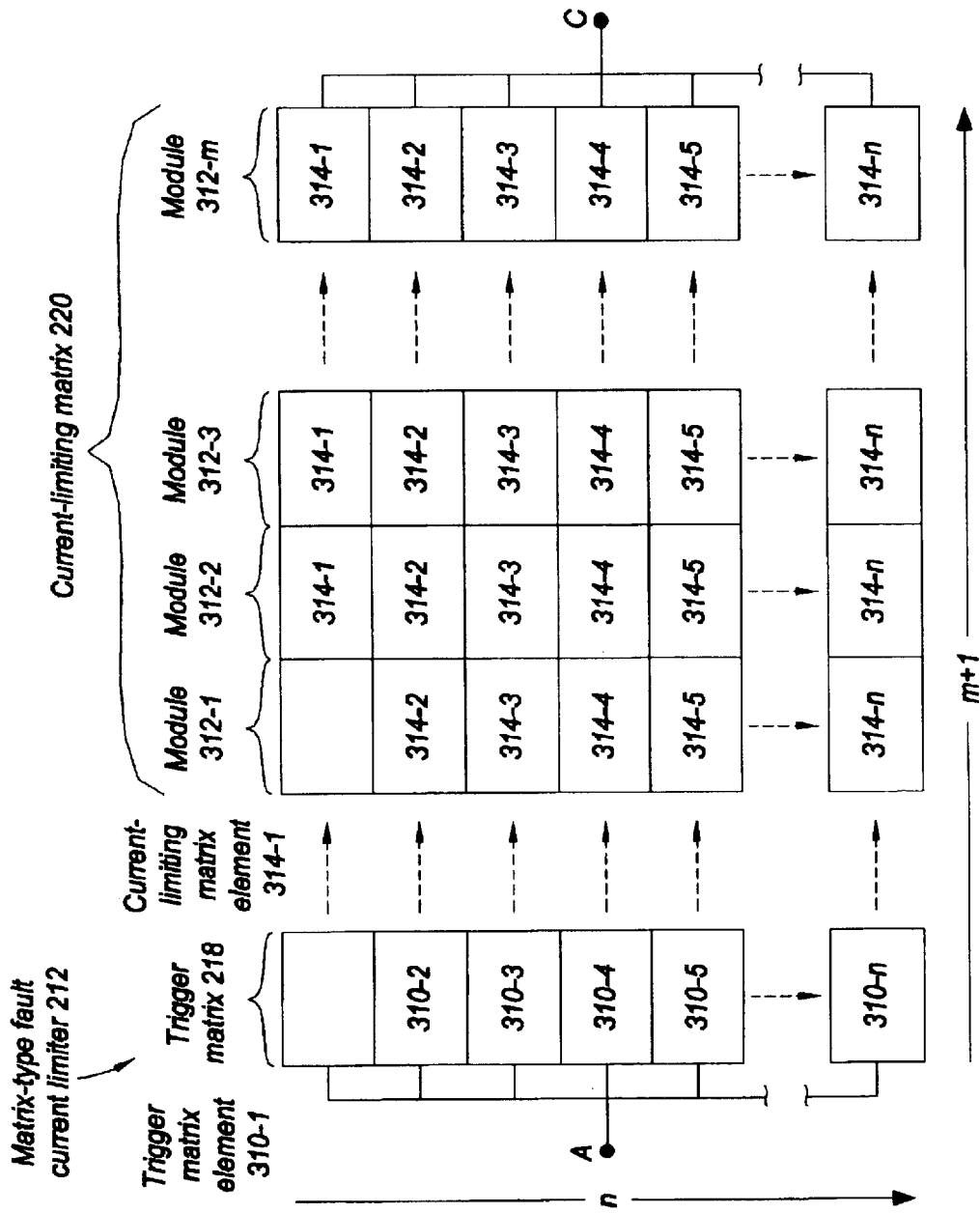
FIG. 3 shows a block diagram of the matrix type current limiter MFCL.

FIG. 3 illustrates a high-level block diagram of the MFCL 212 that includes a "1×n" (column×row) trigger matrix 218 and an "m×n" current-limiting matrix 220. The trigger matrix 218 includes a plurality of trigger matrix elements 310 (i.e., trigger matrix elements 310-1 through 310-n) while the current-limiting matrix 220 contains a plurality of current-limiting modules 312 (i.e., modules 312-1 through 312-m). Each current-limiting module 312 includes a plurality of current-limiting elements 314 (i.e., current-limiting elements 314-1 through 314-n). Each trigger matrix element 310 is to trigger "m" number of current-limiting elements 314 that have the same row number. For example, trigger element 310-1 is to trigger all current-limiting elements 314-1 of modules 312-1 through 312-m.

In the prior art the voltage of the triggering coil is supplied from the voltage of a quenched superconducting triggering element. In one instance the voltage difference between the triggering coils and the superconducting current limiting elements, which are closely adjacent the triggering coils because they are magnetically coupled together, could be large and may cause electrical insulation problems. In this invention, one stepped-down transformer 316-1 is installed between a quenched triggering element 310-1 and the current limiting element 314-1 to isolate the voltage between the triggering element 310-1 and the current limiting element 314-1. As the result, the dielectric insulation incompatibility between the trigger elements and the current limiting elements is improved. Moreover, the voltage of the triggering coils can now be controlled by predetermining the isolation transformer's 316-1 winding ratio. In another instance, the voltage generated by the quenched superconducting trigger element could be low, a stepped-up transformer 316-1 can then be installed between the trigger element 310-1 and current limiting element 314-1 so that a higher voltage across triggering coils can be achieved to generate higher magnetic field to quench the superconducting component in 314-1. Again, the winding ratio of the isolation transformer 316-1 determines the degree of such a voltage transformation. The term "magnetic coupling" is used to describe the physical arrangement between the triggering coil and the superconductor element in which the magnetic field generated in the triggering coil is used to further quench the superconducting element during the current limiting process.

Figure 4:
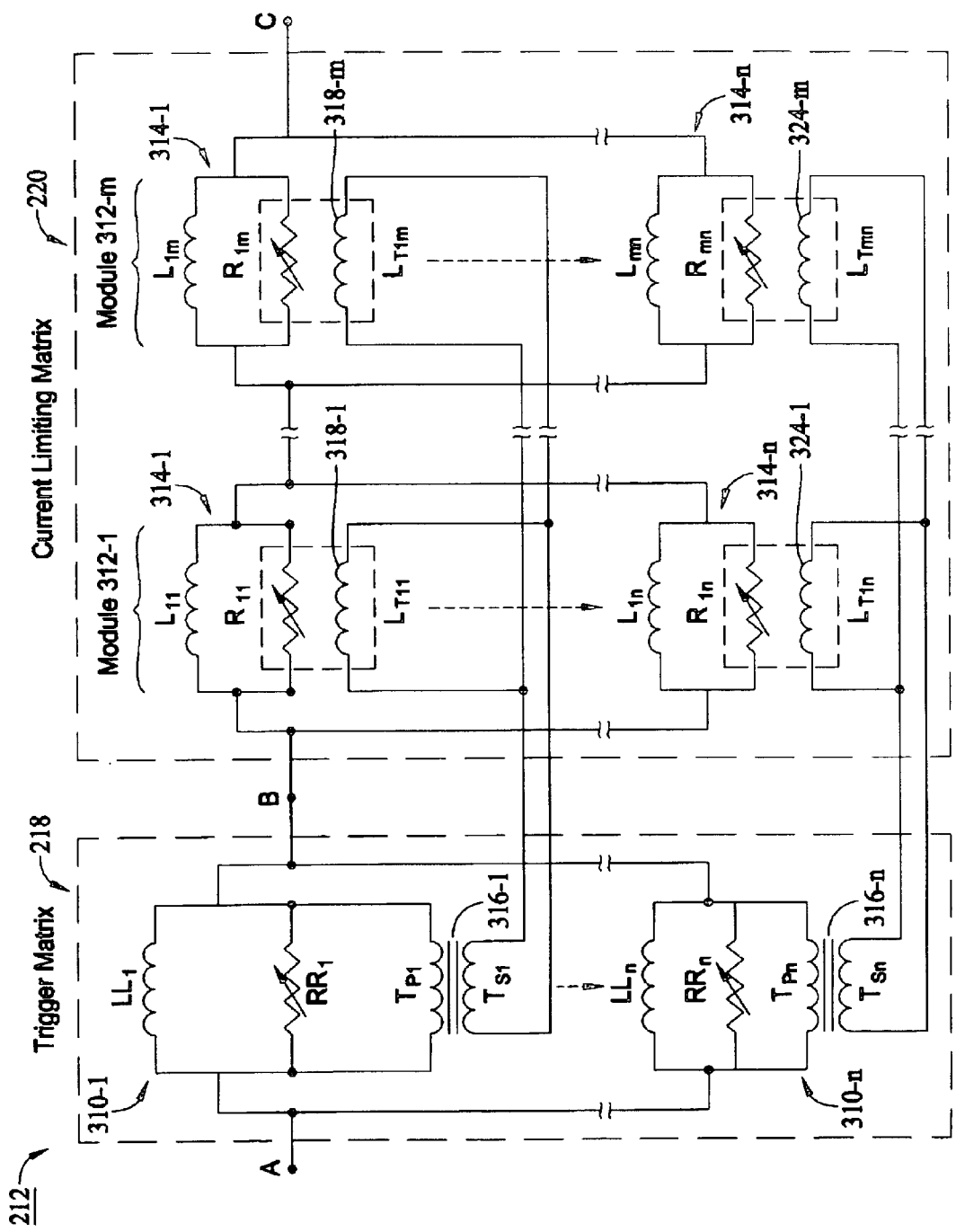
FIG. 4 shows a preferred embodiment of the trigger matrix incorporating isolation transformers and associated current limiting matrix.

FIG. 4 illustrates one embodiment of the MFCL 212 of the present invention. Here an isolation transformer 316-1 is electrically coupled in parallel with the first element of trigger matrix 218. The primary winding $T_{p1}$ of isolation transformer 316-1 is electrically coupled in parallel to $LL_1$ and $RR_1$ of the first trigger matrix element 310-1. The secondary winding $T_{s1}$ of isolation transformer 316-1 is magnetically coupled to each of the current-limiting elements 314-1 of the current limiting modules 312-1 through 312-m via inductor $L_{T11}$ through $L_{T1m}$. Each trigger inductor, from 318-1 through 318-m in row one, up to and including 324-1 through 324-m in row n is magnetically coupled with its corresponding superconducting element $R_{11}$ through $R_{nm}$ (318-1 to $R_{11}$, 318-2 to $R_{12}$, . . . etc.). One isolation transformer 316 is coupled to each of the elements in trigger matrix 218, from 316-1 up to and including isolation transformer 316-n, which is electrically coupled in parallel to trigger element 310-n. The primary winding $T_{pn}$ of the isolation transformer 316-n is electrically connected in parallel to superconducting element $RR_n$ and non-superconducting element $LL_n$. The secondary winding $T_{sn}$ of the isolation transformer 316-n is magnetically coupled to each of the current limiting elements 314-n via inductors $L_{Tn1}$ (324-1 through $L_{Tnm}$ (324-m). The transforming ratio of each isolation transformer 316-1 through 316-n is x:1, where "x" is the relative ratio of the primary winding to the secondary winding and "1" is the relative ratio of the secondary winding to the primary winding.

Figure 5:
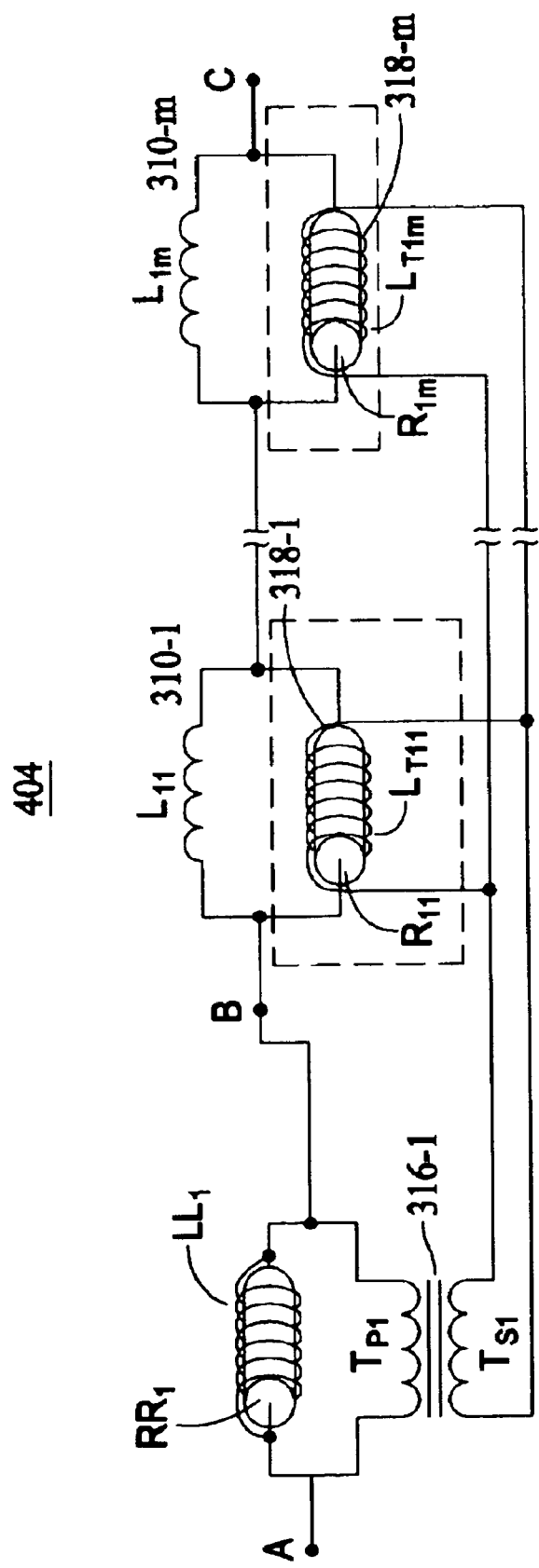
FIG. 5 illustrates a preferred embodiment of the physical relationship between the inductors and superconductors for the MFCL configured as a single trigger matrix element having one isolation transformer, coupled to corresponding current limiting elements of its respective row in the MFCL matrix and an electrical representation thereof.

FIG. 5 illustrates an example of the physical relationship between the non-superconducting inductors, isolation transformer 316-1 and superconductors in the MFCL. In illustration 404, Inductor $LL_1$, is wound around superconductor $RR_1$. The primary winding $T_{p1}$ of isolation transformer 316-1 is electrically connected in parallel with $LL_1$ and $RR_1$. The secondary winding $T_{s1}$ of isolation transformer 316-1 is electrically connected in parallel to inductors $L_{T11}$ (318-1) through $L_{T1m}$ (318-m). Inductor $L_{T11}$ (318-1) is physically wound around superconductor $R_{11}$, and each inductor $L_{T2}$ through $L_{T1m}$ is physically would around the respective superconducting element $R_{12}$ through $R_{1m}$, creating the magnetic coupling between the two. This electrical and magnetic relationship is repeated for each additional trigger element (2–n) and each additional current limiter matrix row (2–n) (not shown). The non superconducting inductors of the current limiters of the present invention may comprise devices selected from the group including rods, bars, tubes, bifilar-wound solenoid coils or other non-inductive devices, which devices are known in the art. The superconducting components of the current limiters of the present invention may comprise coils of electrically conductive materials selected from the group including helically-wound solenoid coils, racetrack coils, or saddle coils, which devices are known in the art.

Figure 6:
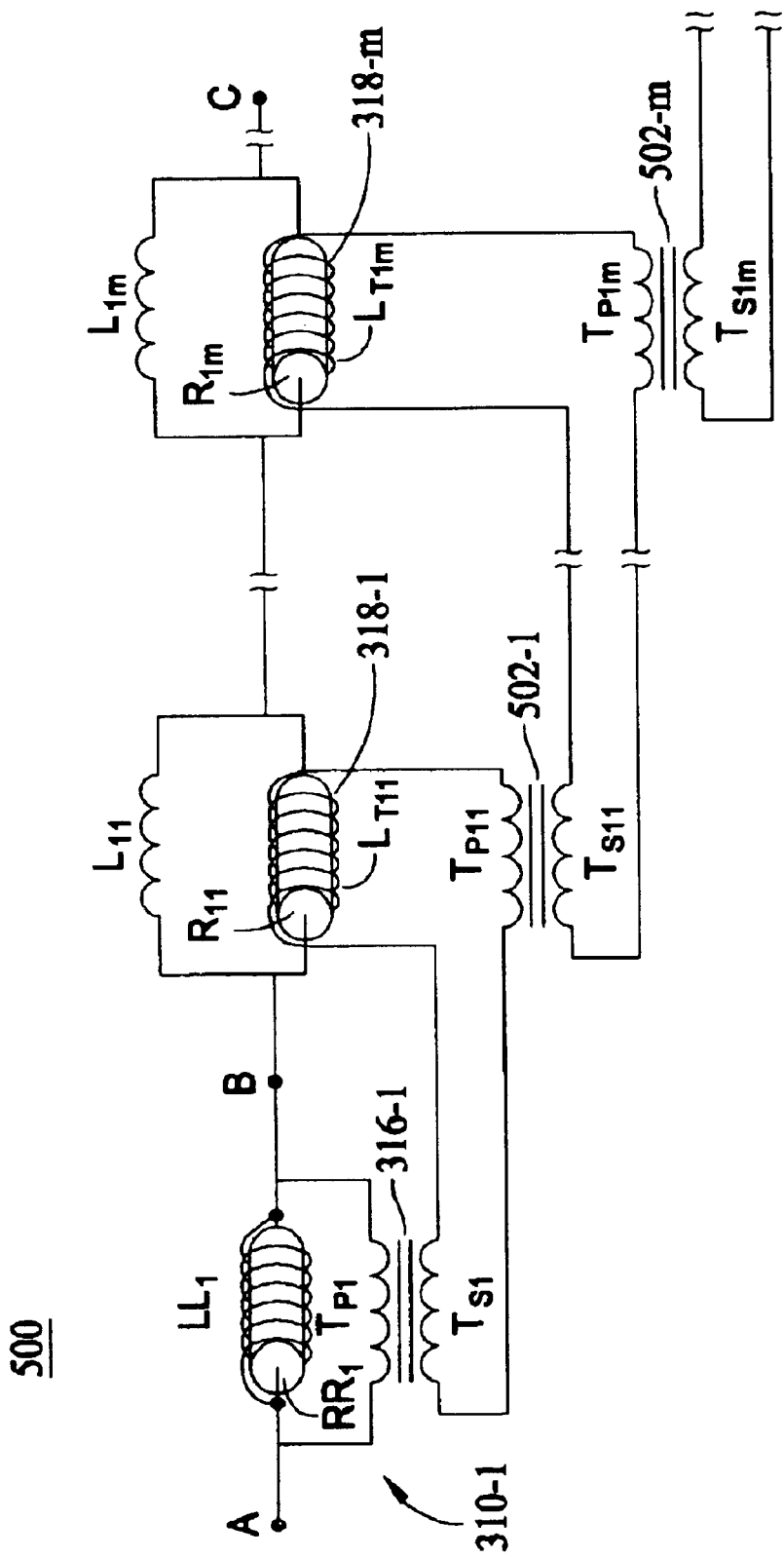
FIG. 6 illustrates an alternative embodiment of the physical relationship between the inductors and superconductors for the MFCL configured such that for respective rows of the MFCL matrix there is one isolation transformer for the trigger matrix element and for each current limiting element.

FIG. 6 illustrates an alternative embodiment of the present invention, wherein a separate isolation transformer is coupled to each element in the trigger matrix 218 and each element in the current limiter matrix 220. In illustration 500, isolation transformer 316-1 for the trigger element 310-1 is coupled to $RR_1$ and $LL_1$ through its primary winding $T_{p1}$. Isolation transformer 316-1 is electrically connected in series to inductor $L_{T11}$ (318-1) and to the primary winding $T_{p11}$ of isolation transformer 502-1. ($L_{T11}$ is magnetically coupled to superconductor $R_{11}$.) The secondary winding $T_{s11}$ of isolation transformer 502-1 is electrically connected in series to inductor $L_{T12}$ (318-2) and to the next isolation transformer 502-2. This current limiter element configuration is repeated for each current limiting matrix element in the MFCL. This electrical and magnetic relationship in illustration 500 is repeated for each additional trigger element 310-2 through 310-n and their corresponding isolation transformer 316-1 through 316-n, and each additional current limiting matrix row (2–n) (not shown).

Figure 7:
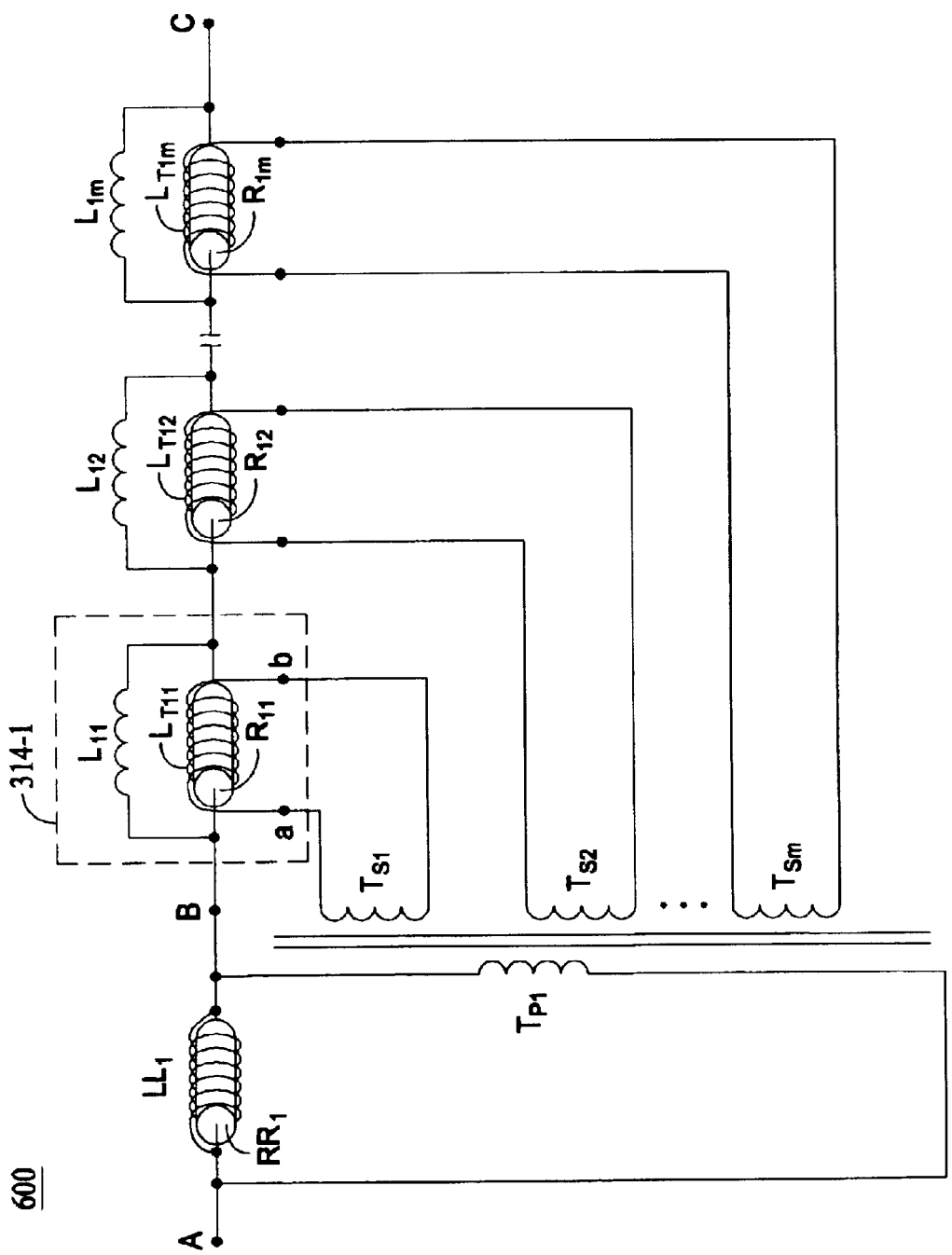
FIG. 7 illustrates a further alternative embodiment of the physical relationship between the inductors and superconductors for the MFCL,configured as a single isolation transformer (for each trigger matrix element) having multiple secondary windings, one secondary winding for at least one current limiting element in the respective row of the current limiting matrix.
Figure 8:
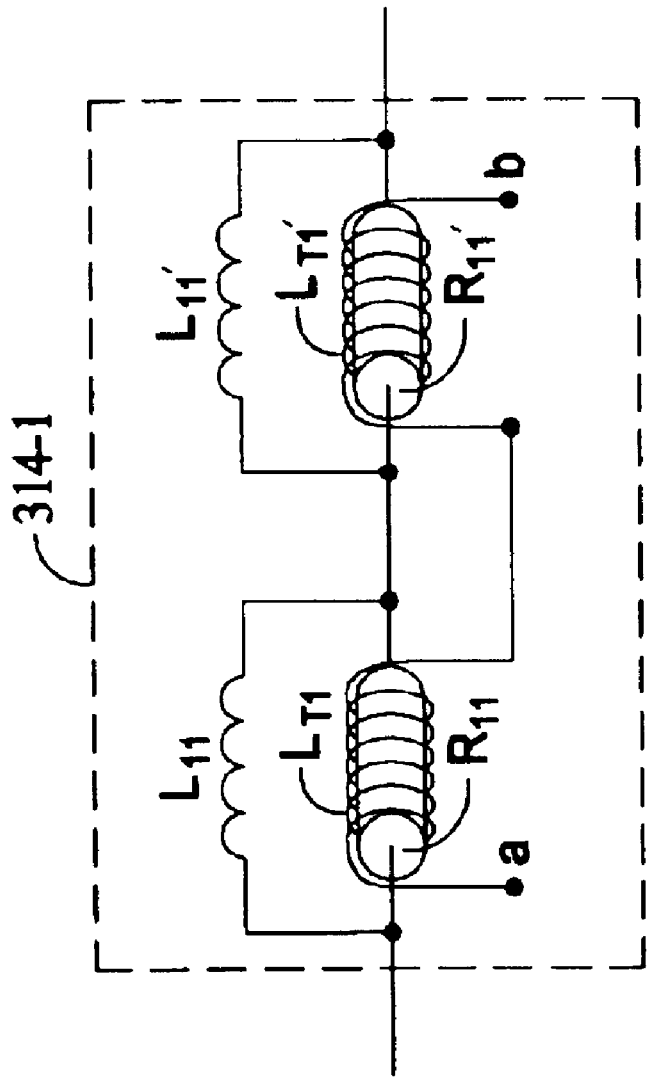
FIG. 8 illustrates a further alternative embodiment of the physical relationship between the inductors and superconductors of a dual current limiting element.

FIGS. 7 and 8 illustrates additional alternative embodiments of the physical relationship between the inductors, isolation transformer, and superconductors of the MFCL. Illustration 600 shows that in the first trigger matrix element 310-1, inductor $LL_1$ is wound around superconductor $RR_1$ The primary winding $T_{p1}$ of isolation transformer 316-1 is electrically connected in parallel with $LL_1$ and $RR_1$. A plurality of secondary windings $T_{s1}$ through $T_{sm}$ of isolation transformer 316-1 are magnetically coupled to current limiting elements 314-1 via inductors $L_{T11}$ through $L_{T1m}$. Inductor $L_{T11}$ is physically wound around superconductor $R_{11}$ and each inductor $L_{T12}$ through $L_{T1m}$ is physically would around the respective superconducting element $R_{12}$ through $R_{1m}$. This electrical and magnetic relationship is repeated for each additional trigger element (2–n) and each additional current limiter matrix row (2–n) not shown. This embodiment is beneficial because the relative voltage boost or reduction from the primary winding to each respective secondary winding of isolation transformer 316-1 can be predetermined and/or adjusted, through utilization of different transforming ratio, to accommodate the difference between the superconducting elements in the current limiter matrix. This embodiment can also be configured so that each secondary winding of the isolation transformer can be used to be magnetically coupled to more than one or (in this example a dual) current limiting element 314-1, as exemplified by the diagram in FIG. 8.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A matrix superconducting current limiter having a current limiting matrix, said current limiter comprising:

a trigger matrix, wherein the trigger matrix and the current limiting matrix are electrically connected in series with one another, and are composed of components made of superconducting and non-superconducting electrically conductive materials;

wherein the trigger matrix comprises n, n being $\geq 1$, trigger elements arranged in a one column×n row matrix fashion where the n number of trigger elements are electrically connected in parallel with one another, each trigger element comprising at least one non inductively arranged superconducting component electrically connected in parallel with a plurality of non-superconducting components;

wherein the current limiting matrix comprises m×n, with m being $\geq 1$, current limiting elements arranged in a m column×n row matrix fashion where n number of current limiting elements are electrically connected in parallel with each other to form one current limiting module, and where m number of current limiting modules are electrically connected in series with one another, each current limiting element comprising at least one non-superconducting component; and wherein one of the components of the trigger matrix is a transformer having at least one primary and at least one secondary winding and having a transforming ratio of x:1, wherein the at least one primary winding is electrically connected in parallel to other components of the trigger matrix and wherein the at least one secondary winding of the transformer is electrically connected in parallel to at least one inductor, wherein the at least one inductor is magnetically coupled to at least one superconductive component in the current limiting matrix.

2. The current limiter of claim 1 wherein said at least one secondary winding of the transformer is connected in series with at least one inductor that is magnetically coupled to at least one superconducting component in the current limiting matrix.

3. The current limiter of claim 1 comprising superconducting components selected from the group including rods, bars, turbes, bifilar-wound solenoid coils and other non inductive forms.

4. The current limiter of claim 1 wherein the non-superconducting components are coils made of electrically conductive materials selected from the group including helically-wound solenoid coils, racetrack coils and saddle coils.

5. The current limiter of claim 4 wherein the non-superconducting components in each trigger element is is physically wound around the superconducting component of the trigger element.

6. The current limiter of claim 4 wherein a single non-superconducting inductive or resistive component is electrically connected in parallel to the entire current limiting matrix section, with an additional non-superconducting component electrically connected in parallel with the superconducting component in a current limiting element.

7. The current limiter of claim 4 where n is greater than 1.

8. The current limiter of claim 4 where m is greater than 1.

9. The current limiter of claim 4 where x is less than 1, so as to provide lower voltages between the trigger matrix elements and the current limiting matrix elements.

10. The current limiter of claim 4 where x is greater than 1, so as to provide higher voltages between the trigger matrix elements and the current limiting matrix elements.

11. A matrix superconducting current limiter having a current limiting matrix, said current limiter comprising:

a trigger matrix, wherein the trigger matrix and the current limiting matrix are electrically connected in series with one another, and are composed of components made of superconducting and non-superconducting electrically conductive materials;

wherein the trigger matrix comprises n, n being $\geq 1$, trigger elements arranged in a one column×n row matrix fashion where the n number of trigger elements are electrically connected in parallel with one another, each trigger element comprising at least one non inductively arranged superconducting component electrically connected in parallel with a plurality of non-superconducting components;

wherein the current limiting matrix comprises m×n, with m being $\geq 1$, current limiting elements arranged in a m column×n row matrix fashion where n number of current limiting elements are electrically connected in parallel with each other to form one current limiting module, and where m number of current limiting modules are electrically connected in series with one another, each current limiting element comprising at least one non-superconducting component; and wherein one of the electrically conductive components is a transformer having a primary and a plurality of secondary windings of variying ratios, wherein the primary winding is electrically connected in parallel to other components of the trigger matrix and wherein each of the plurality of secondary windings of the transformer is magnetically coupled to a respective superconductive component of a respective column of the current limiting matrix.

12. The current limiter of claim 11, wherein a single non-superconducting inductive component is electrically connected in parallel to the entire current limiting matrix section, with an additional non-superconducting component electrically connected in parallel with the superconducting component in the current limiting element.

13. The current limiter of claim 11, wherein a single non-superconducting inductive component is electrically connected in parallel to the entire current limiting matrix section.

14. The current limiter of claim 11, wherein a single non-superconducting resistive component is electrically connected in parallel to the entire current limiting matrix section, with an additional non-superconducting component electrically connected in parallel with the superconducting component in the current limiting element.

15. The current limiter of claim 11, wherein a single non-superconducting resistive component is electrically connected in parallel to the entire current limiting matrix section.

16. The current limiter of claim 11, wherein the superconducting components are selected from the group including rods, bars, tubes, and bifilar-wound solenoid coils.

17. The current limiter of claim 11, wherein each current limiting element further comprises dual current limiting elements coupled in series, wherein each daul current limiting element comprises a non-superconducting component and a superconducting component copuled in parallel.

18. The current limiter of claim 17, wherein the non-superconducting components are coils made of electrically conductive devices selected from the group including helically-wound solenoid coils, racetrack coils and saddle coils.

19. The current limiter of claim 18, wherein the non-superconducting components in each trigger element is physically wound around the superconducting component of the trigger element.

20. A matrix superconducting current limiter having a current limiting matrix, said current limiter comprising:

a trigger matrix, wherein the trigger matrix and the current limiting matrix are electrically connected in series with one another, and are composed of components made of superconducting and non-superconducting electrically conductive materials;

wherein the trigger matrix comprises n, n being $\geq 1$, trigger elements arranged in a one column×n row matrix fashion where the n number of trigger elements are electrically connected in parallel with one another, each trigger element comprising at least one non-inductively arranged superconducting component electrically connected in parallel with a plurality of non-superconducting components;

wherein the current limiting matrix comprises m×n, with m being $\geq 1$, current limiting elements arranged in a m column×n row matrix fashion where n number of current limiting elements are electrically connected in parallel with each other to form one current limiting module, and where m number of current limiting modules are electrically connected in series with one another, each current limiting element comprising at least one non-superconducting component;

wherein one of the electrically conductive components is a transformer having a primary and a plurality of secondary windings of varying ratios, wherein the primary winding is electrically connected in parallel to other components of the trigger matrix;

wherein the plurality of secondary windings of the transformer is connected in series with a respective inductor that is magnetically coupled to each of the superconducting components in the current limiting matrix; and wherein each current limiting element further comprises dual current limiting elements coupled in series, wherein each daul current limiting element comprises a non-superconducting component and a superconducting component copuled in parallel, wherein the respective superconducting component has the respective inductor magnetically coupled in series to each dual superconducting component.

* * * * *